July 16, 1974     H. G. OSWIN ET AL     3,824,168
GAS DETECTING AND QUANTITATIVE MEASURING DEVICE
Filed June 16, 1972     4 Sheets-Sheet 4 ical cell, and read-out
United States Patent Office 3,824,168
Patented July 16, 1974

3,824,168
GAS DETECTING AND QUANTITATIVE MEASURING DEVICE
Harry G. Oswin, Chauncey, and Keith F. Blurton, Ossining, N.Y., assignors to Energetics Science, Inc., New York, N.Y.
Continuation-in-part of applications Ser. No. 88,267, Nov. 10, 1970, and Ser. No. 172,486, Aug. 17, 1971. This application June 16, 1972, Ser. No. 263,531
Int. Cl. G01n 27/46; A61b 5/00
U.S. Cl. 204—195 R        3 Claims

ABSTRACT OF THE DISCLOSURE

An improved device for the detection of, and quantitative measurement of a gas in a given environment, such as alcohol in the breath, is described. The device comprises intake means, reservoir means, and flow control means for a gas sample; an electrochemical cell having a low resistance anode, a cathode, a reference electrode, and an electrolyte in contact with the anode, cathode, and reference electrode which electrochemically measures the gas being detected; valve means for splitting the gas flow from the gas reservoir into fractions, and pump means for drawing the gas sample from the intake means through the reservoir, through the valve means, and to the electrochemical cell. The anode, to ensure that the current production is a result of the gas being detected and not other gases including oxygen, is maintained at a fixed potential in relation to the potential of the reference electrode. The device provides an accurate, rapid and inexpensive means of detecting and quantitatively measuring a gas contained in a given environment, i.e., alcohol in the breath of the subject being tested or carbon monoxide in the atmosphere, utilizing small gas samples thereby permitting the use of compact, portable units.

This application is a continuation-in-part of our co-pending applications U.S. Ser. No. 88,267 filed Nov. 10, 1970; and U.S. Ser. No. 172,486 filed Aug. 17, 1971.

FIELD OF INVENTION AND BACKGROUND

The invention relates to an improved device for detecting and quantitatively measuring the quantity of a select gas in a gaseous medium. More particularly, the invention relates to a device which is compact, dependable, easy to operate, rapid and relatively inexpensive for detecting and quantitatively measuring a gas such as carbon monoxide, hydrocarbons, or an alcohol in an environment. The device includes intake means and reservoir means for the gaseous sample; valve means for dividing the gas sample coming from the reservoir means; an electrochemical cell for detecting and quantitatively measuring the select gas, and means for drawing the gas sample being analyzed into the device through the intake; reservoir means and gas dividing means, and to the detecting cell. The device, as a result of the low resistance of the anode of the electrochemical cell, will permit an accurate, rapid quantitative determination of the gas being detected in the sample, which permits the use of a very small gas sample permitting the construction of a small, compact, portable device. The gas sample splitting means permits the tail portion, or last sample into the device to be selectively retained and analyzed. This is particularly critical in measuring alcohol content of a subject's breath where, as will be developed later, the analyzed sample must come from the lungs or alveolae, i.e., not from the mouth or throat. Furthermore, in accordance with an embodiment of the invention, the reservoir, valve means, and electrochemical cell are maintained at a predetermined temperature by a latent heat reservoir permitting operation of the device over a wide temperature range without possible fluctuations in the quantitative reading due to possible temperature change. Although the invention is not limited thereto, for convenience it will be described primarily with reference to a device for detecting and measuring the alcoholic content in the breath of a test subject. As will be apparent, however, the device can be modified or adapted for detecting and measuring carbon monoxide; hydrocarbons, including separation of saturated and unsaturated hydrocarbons; gases capable of being converted to alcohols, carbon monoxide, or hydrocarbons; or other gases which can be electrochemically consumed where similar conditions apply.

The social problem caused by the drinking or drunken driver is noted in co-pending U.S. Ser. No. 172,486. As described therein, the degree of drunkenness in a human being is determined by the alcohol content of the blood. As further described in U.S. Ser. No. 172,486, the alcohol content of the blood is directly correlatable to the alcohol content of the alveolar breath, i.e., the breath from the alveolae which are the small bulbs in the lungs where oxidation of blood impurities takes place. Accordingly, in view of the difficulty in taking a blood sample, a need exists for a portable, compact, inexpensive, and easy-to-operate device for accurately and reproducibly detecting and quantitatively determining the blood alcohol level of a test subject from analysis of a breath sample.

In the aforesaid U.S. Ser. No. 172,486, a gas detecting unit is described capable of detecting and quantitatively measuring alcohol in a breath sample or carbon monoxide in a gas sample, or the like, which comprises in combination intake means, an electrochemical cell, means for drawing a gas through the intake means and into the electrochemical cell at a controlled flow rate, and read-out means for reading the quantity of detected gas. The electrochemical cell comprises an anode which provides a catalytic site for electrochemical reaction of the gas being detected, i.e., an alcohol, carbon monoxide, etc.; a cathode; reference electrode, and an electrolyte in contact with the anode, cathode, and reference electrode. The anode of the cell is maintained at a fixed potential relative to the potential of the reference electrode which is substantially free of current flow to ensure that the current production is a result of the gas being detected and not other gases including oxygen. The fixed potential is selected within the range of from about 0.7 to 1.5 volts in order that only the gas being detected is electrochemically reacted, precluding the possibility that other gases in the sample as well as an oxygen/water redox couple will influence the current produced. The means for drawing the gas through the intake means into the cell will effectively pass a predetermined quantity of gas to a predetermined anode surface area, thereby assuring the continuous accuracy in the quantitative measurement. Preferably, the quantity of gas fed to the anode surface is controlled by a constant flow control means which feeds the gas sample to the electrochemical cell at a constant rate with the balance of the gas sample being vented off. Pumping or suction means are normally employed to draw the gas sample through the intake means, the electrochemical cell, and flow control means in metering amounts.

Although the device described in the aforesaid U.S. Ser. No. 172,486 is highly satisfactory, improvements therein have now been discovered which permit the use of a smaller gas sample, permitting a still smaller portable unit; a convenient and economical means for maintaining a portable device at a constant temperature, and means for conveniently and accurately separating and analyzing the tail end, or last sample to enter the detector device.

OBJECTS AND GENERAL DESCRIPTION OF THE INVENTION

Accordingly, a primary object of the present invention is to provide a compact, inexpensive, and easy-to-operate device for accurately and reproducibly detecting and quantitatively determining the level of a given gas in a specific environment utilizing a small gas sample permitting the construction of a small unit which will give a rapid measurement.

Another object of this invention is to provide a compact, inexpensive, and easy-to-operate device for accurately and reproducibly detecting and quantitatively determining the blood alcohol level of a test subject from substantially only the alveolar breath.

It is another object of this invention to provide a compact, inexpensive, and easy-to-operate device for accurately and reproducibly detecting and quantitatively determining the level of a given gas in a specific environment without possible fluctuation in the read-out as a result of possible temperature change.

These and other objects of the present invention will be more readily apparent from the following detailed description with particular emphasis being directed to the drawings and preferred embodiments.

The aforesaid objects of the present invention are accomplished by modifying the detecting unit of U.S. Ser. No. 172,486. The rapid response time is obtained by utilizing an electrochemical cell having an anode with a very low resistance, i.e., an $iR$ (internal resistance) of less than 5 ohms and preferably less than 2 ohms. In practice, an anode having an $iR$ of from 1 to 5 ohms is satisfactory. This low resistance, as will be treated more fully later, will provide a very fast or rapid response time, permitting the use of a very small gas sample. The ability to separate and analyze only the tail or end portion of a given gas sample—which is particularly critical when using a small gas sample and measuring the alcohol content of a subject's breath where the alveolae breath is needed—is accomplished by having a small (approximately 22 ccs.) sample reservoir adjacent to the intake means of the detector unit which, in turn, is adjacent to or in line with valve means having alternate or first and second passages. In the initial operating mode, the first passage will be open and in communication with switch means, such as a pressure switch. The switch means is directly dependent upon the length of time and pressure of a presented gas sample. The switch is designed to activate an analyze signal, such as a light, only if the presented gas sample (breath) is given for a minimum specified time at a minimum specified pressure. When the analyze signal is actuated while a subject is presenting his breath, this is an indication that the proper gas sample (breath) has been given and that the last part of the gas sample, i.e., approximately 20 ccs., of gas sample (breath) to be analyzed is retained in the reservoir. Thereafter, switch means on the valve means are actuated to close the first passage and to open the second passage which will carry the gas sample to the electrochemical sensor to be quantitatively analyzed. In order to avoid fluctuation in the reading of the detector unit as a result of temperature change which could cause condensation of a gas sample (breath) presented at low temperatures, it is preferable that the detector unit be maintained at a given temperature as, for example, 50° C. This temperature is unrealistic in a completely portable unit if the unit must include in situ means for maintaining such temperature. One suggested means is to have the portable unit maintained at a fixed temperature in a suitable environment, as for example a police officer's patrol car by having the unit plugged into the electrical system of the patrol car. However, even a portable unit must be out of the environment of the patrol car for periods of up to a half hour or longer during the taking of a breath sample. Accordingly, in accordance with the present invention, the unit defined in U.S. Ser. No.A 172,486 is modified to have the gas sample reservoir and electrochemical sensor cell adjacent to, or in heat association with a heat reservoir which stores heat as latent heat of fusion. Any suitable material with a high latent heat of fusion per unit weight or volume can be employed. Preferably, due to low cost and convenience, a wax having a melting point of above about 50° C. is used. In operation, the unit is supplied with sufficient heat energy from a car battery or the like when in the environment of a patrol car or the like to maintain the wax molten. When the unit is needed outside the environment of the patrol car, it is unplugged. Due to the latent heat of fusion the temperature of the unit will be maintained constant for a period of up to an hour or longer. An indicator can be employed in association with the unit to indicate when the unit has fallen below temperature, cautioning the operator to again heat the wax or the like in the heat reservoir to its fusion temperature before further use.

The detecting device of the present invention will be more readily apparent from the accompanying drawings wherein like numerals are employed to designate like parts. In the drawing, FIG. 1 is a flow sheet of a detecting unit primarily designed for collecting an alveolae breath sample and thereafter analyzing such sample;

Figure 6:
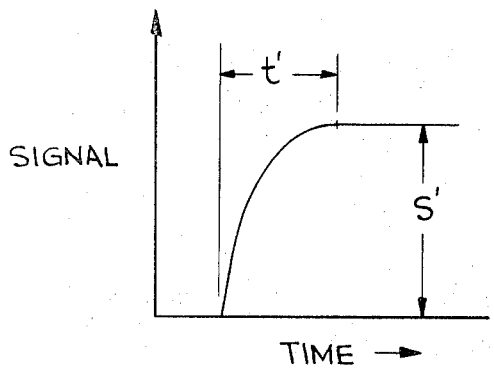
FIG. 6 is a graph showing the response of an electrochemical sensor cell as a function of time and the percent alcohol in the breath.

Heretofore the response time of an electrochemical cell utilizing a working electrode, a cathode, and reference electrode for detecting and quantitatively sensing carbon monoxide, alcohol, etc., was defined as the time $t'$ required for the cell to reach a steady-state signal $S'$ on a given gas sample, as shown in FIG. 6. A critical limitation of such a cell, therefore, is the time required to reach steady-state, and the need to have a sufficiently large gas sample available to reach steady-state. For many applications, such as in a carbon monoxide exhaust sensing loop or alcohol in the breath determination, a rapid response time is desirable if not essential and, furthermore, it is desirable if not essential to obtain an accurate determination with a small gas sample.

Figure 7:
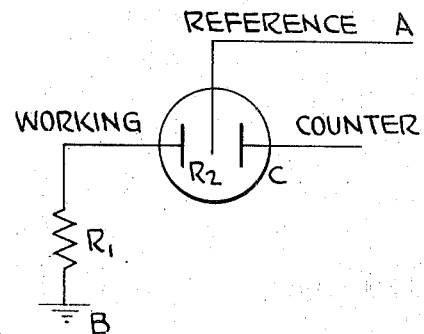
FIG. 7 is a diagrammatic view of a sensor cell.

It has now been discovered that the major limiting factor for response time is the resistance of the working electrode, i.e., the anode of a three electrode system of the type referred to in U.S. Ser. Nos. 88,267 and 172,486. To a much lesser extent, the electrolyte resistance and cell geometry contribute to the response time. Specifically, the resistance of the working electrode is a function of the potential controlling circuit used to maintain the working electrode at a fixed potential. Referring to FIG. 7, the operational amplifier senses the potential difference between points A and B, compares it with a known fixed potential applied from a DC source, and then adjusts the current flowing through the cell C–B to keep the potential between A and B constant. The flow of current between C and B can cause the amplifier to see false or unwanted potential changes if significant resistance exists between A and B. Current flowing through these resistances will cause a potential drop in the system for which the amplifier will correct. Since the object of potential control is to hold the potential between working and reference electrodes constant, an $iR$ correction of this type actually causes the working electrode potential to decrease. The potential will remain at its new value on the working electrode as long as $i$ is constant. As $i$ diminishes, the working electrode potential will shift back or increase towards its normal value. Accordingly, when current flows through the cell (by oxidation of a sample gas), the potential of the working electrode is lowered. If the working electrode contains platinum black, this results in reduction of the surface oxide, i.e., providing a cathodic current, which tends to lower the anodic current output of the cell until a steady potential is reached. When a steady potential is reached, the anodic signal will be normal for the given gas concentration, but the net result is that the response time is longer in order to reach this steady anodic current. Minimizing the resistance between the reference electrode and ground, i.e., $R_1$ and $R_2$ of FIG. 7, will effectively decrease the response time necessary to reach a steady state. Accordingly, by maintaining the anode resistance at a value of less than 5 ohms and preferably less than 2 ohms, a rapid response time is obtainable. Furthermore, due to this rapidity of response time, a smaller gas sample can be utilized as will be seen hereinafter.

Figure 8:
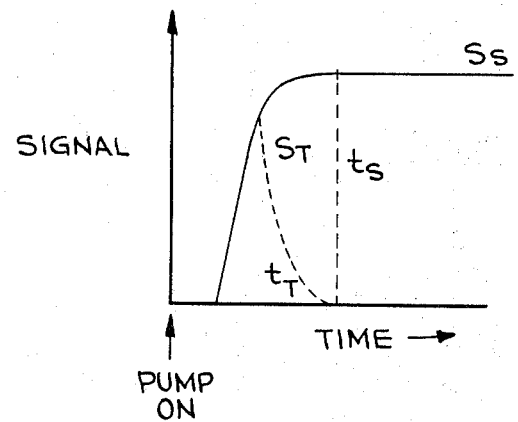
FIG. 8 is a graph which illustrates the non-steady state sensing of gases as a function of time and the gas to be detected.

It has also been found, quite surprisingly, that an accurate quantitative sample gas measurement can be obtained without reaching a steady-state signal provided the internal resistance of the anode is extremely small, thereby providing a rapid response time. Thus, in reference to FIG. 8 by employing a cell with a rapid response time a small sample reservoir leading to the electrochemical sensor cell will provide a non-steady state signal equal to $S_T$ after $t_T$ seconds instead of a signal $S_s$ after $t_s$ seconds. It has been determined that the ratio $S_T/S_s$ is constant over large concentration ranges of a detectable gas such as an alcohol, carbon monoxide, etc.

The aforesaid ability to obtain an accurate determination with a small sample is extremely important in a portable detector unit where it is desirable to have the unit as small as possible. Thus, in a small unit, it is desirable to have a minimum size sample since the larger the sample, the larger the detector unit needed to process the sample. However, with a unit where it is necessary to reach a steady-state before obtaining an accurate measurement it is essential to have a large amount of sample to reach the steady-state condition. Accordingly, the present invention which permits the obtaining of an accurate reading without reaching a steady-state condition as a result of rapid response time obtained through the use of an electrochemical cell having a very low internal resistance, primarily due to the low resistance of the working electrode, it is possible to provide a portable unit which is extremely small and capable of utilizing only a small gas sample. This is highly important in measuring carbon monoxide in gas emissions where it is essential to immediately note and record any change in the concentration of the gases being emitted.

Figure 4:
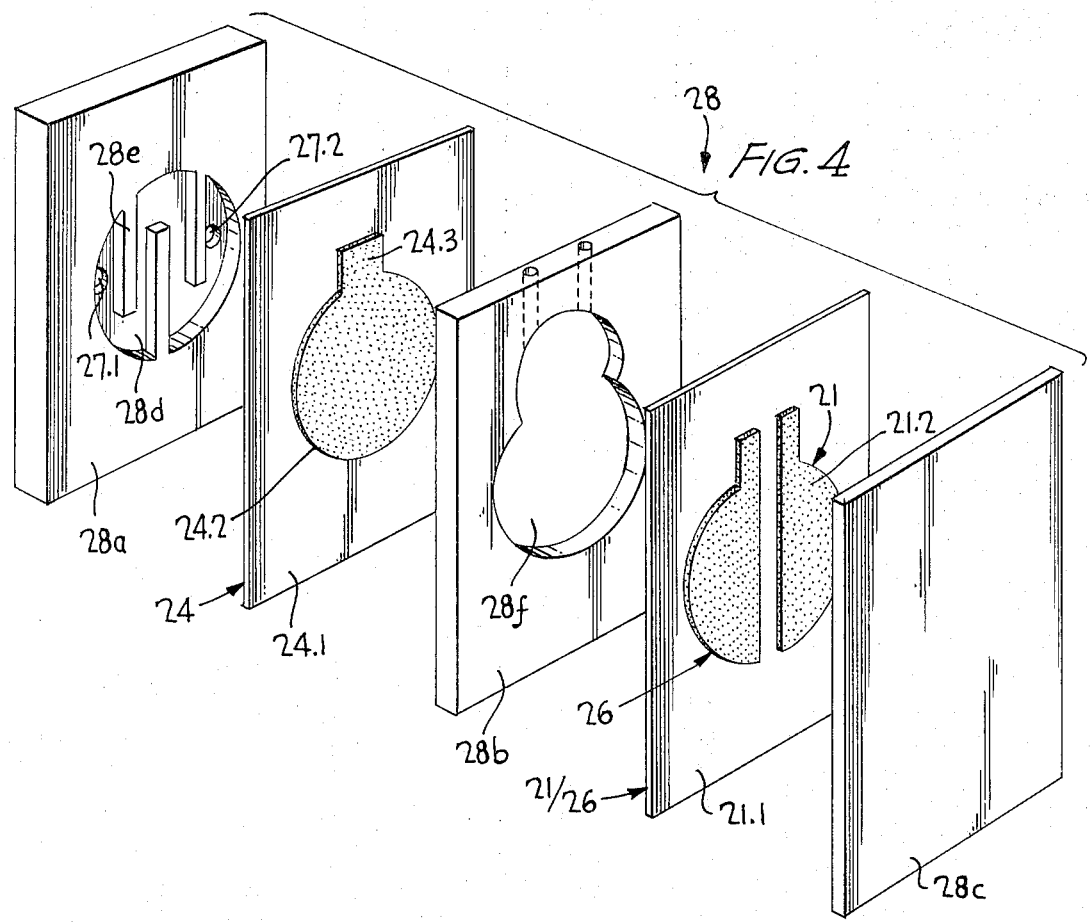
FIG. 4 is an exploded view of a typical electrochemical sensor cell.

The electrochemical cell providing a rapid response time and permitting the use of a small gas sample is of the same configuration shown in U.S. Ser. No. 172,486 noting particularly FIG. 4. The critical feature is to maintain the resistance of the anode at a low level. Referring to FIG. 4 of the present application, the cell comprises a housing 28 which is constructed of three pieces, 28a, 28b, and 28c. 28a has a cavity 28d having holes which form gas inlets 27.1 and 27.2. A labryinthical path is formed by vertical ribs 28e. An anode 24 comprising a polytetrafluoroethylene substrate 24.1 and having a coating of platinum and polytetrafluoroethylene (PTFE) particles applied as a suitable pattern 24.2 is adjacent to element 28a in order that the PTFE substrate is in contact with the reactant gas. Section 28b is adjacent to anode 24 and contains a hole 28f which serves as the electrolyte cavity. The cavity has an extension which maintains the hydrostatic head above the electrolyte constant and serves as a reservoir to accommodate any change in volume of the electrolyte due to environment. Additionally, air through the electrolyte contacts cathode 21 which again is on a PTFE substrate 21.1. The substrate 21.1 also serves as the base for reference electrode 26. In this manner the cell can be extremely compact. In order to show the pattern of the cathode and reference electrode, the compound 21/26 is reversed. In actuality, cathode 21 and reference electrode 26 are in contact with the electrolyte of the cell. Housing 28c forms the top of the cell and together with housing elements 28a retains the elements of the cell in operative association. Electrical leads from the cell, not shown, are fitted through the cell housing.

The anode, cathode, and reference electrode which are utilizable in accordance with the present invention are the electrodes defined in our earlier co-pending applications. Again, it is noted that the essential feature, in accordance with the present invention, is that the anode have an internal resistance of less than 5 ohms and preferably less than 2 ohms and the overall cell have a low internal resistance to permit fast response time. Preferably, all three electrodes as shown in FIG. 4 will have Teflon substrates and a platinum/PTFE catalyst layer. These electrodes are exceptional from the standpoint of reproducibility, stability, and overall performance.

To obtain low internal resistance of the cell, it is preferable to employ a minimum of electrolyte, thereby decreasing the electrolyte spacing and concurrently the internal resistance. To further decrease the $iR$, a free liquid electrolyte, as opposed to electrolyte in a matrix, is preferred. Further, it is preferable to employ an efficient conductor, not shown in FIG. 4 of the drawing, on the electrode structure whereby the furtherest catalytic point on the electrode is still close to the conductor, again minimizing the internal resistance of the electrode. These features will be apparent to one skilled in the art and, accordingly, are not intended to be restrictive.

Figure 1:
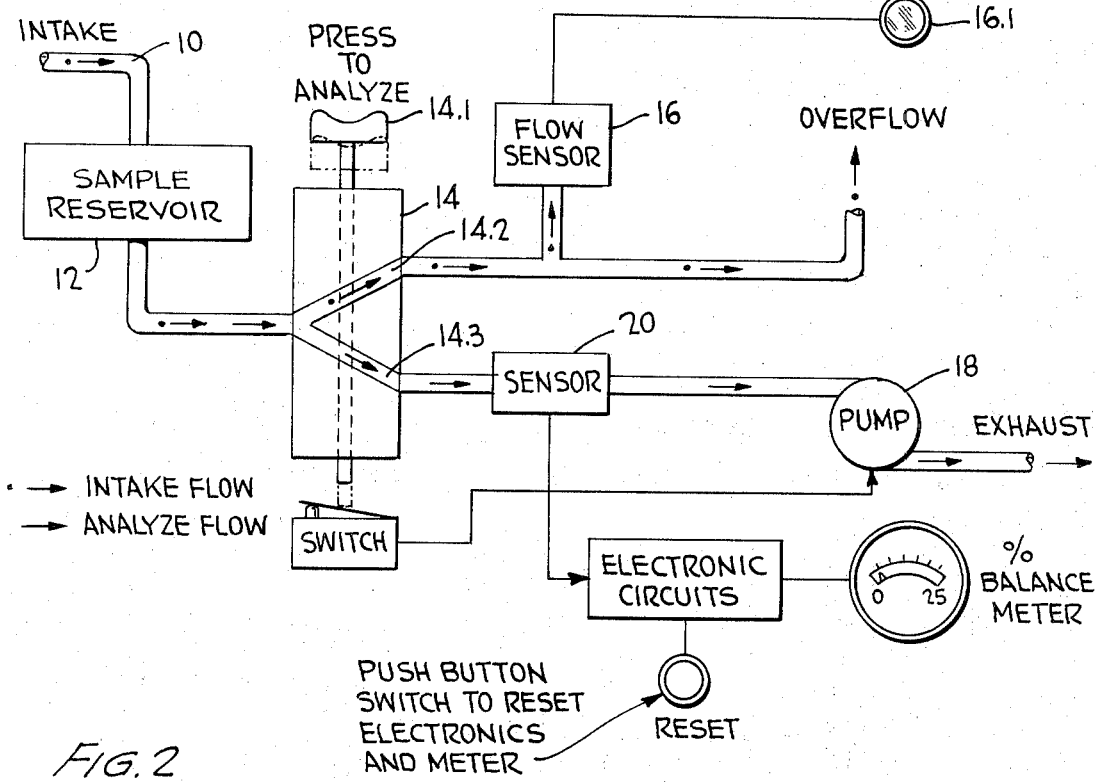
Figure 2:
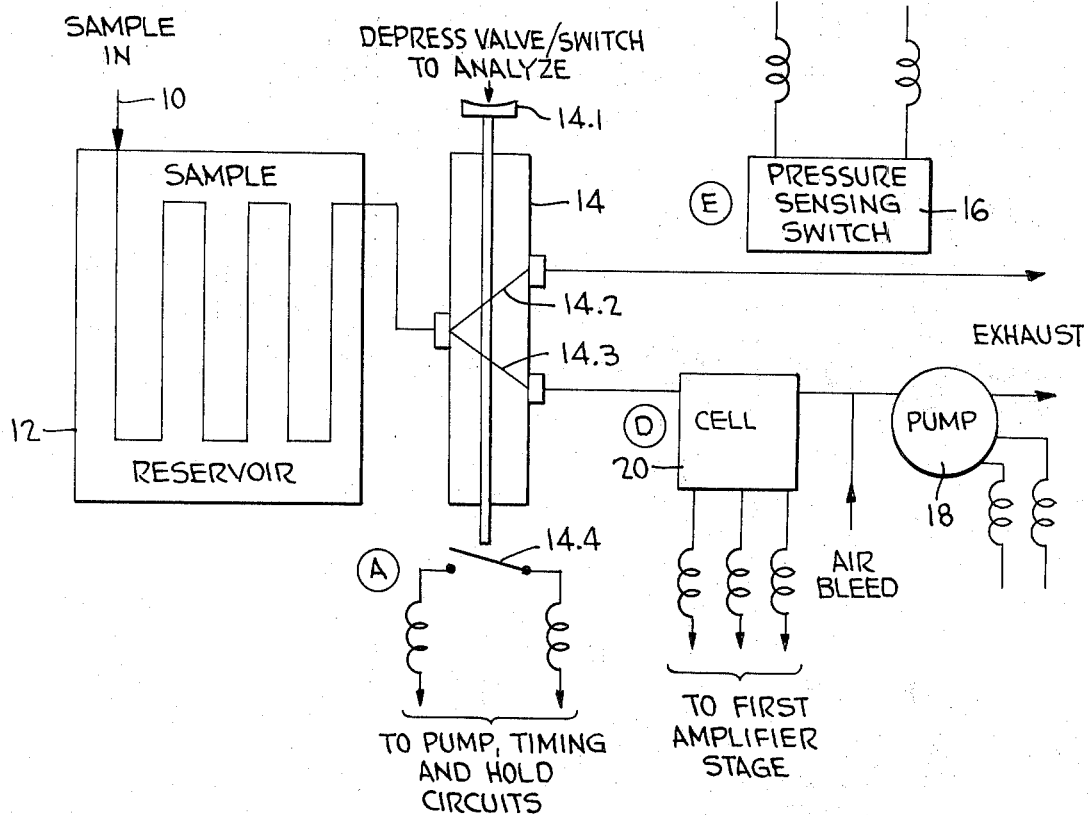
FIG. 2 is a block diagram showing the unit of FIG. 1, keying the electronic circuitry to the electronic circuit diagram of FIG. 5.

Referring now to FIGS. 1 and 2 of the drawing, a flow diagram of the detector unit of the present invention is seen. The detector unit comprises a sample intake means 10, a sample reservoir 12 which will hold approximately 20 ccs. of gas sample, with the sample reservoir being in comunication with a valve 14. This valve has a two-way passage permitting the gas sample from the reservoir to pass in alternate paths. When the valve is in a first position or operational mode, gas will flow through the valve to activate pressure switch 16 which in turn communicates with a signal, such as signal light 16.1 shown in FIG. 1 but not in FIG. 2. The pressure sensing switch and signal light, set at a predetermined level, are directly dependent upon the length of time that sample enters the detector and the pressure of sample entering the detector. Once the predetermined amount of gas at the predetermined pressure is sensed by the pressure sensing switch, indicator signal 16.1 will be activated. At that time valve activation means 14.1 is activated causing passage 14.2 to close and passage 14.3 to open. At the same time pump 18 is actuated pulling the tail portion of the gas sample retained in the sample reservoir 12 into sensor cell 20 for analysis. This sensor cell was more completely defined hereinbefore with reference to FIG. 4.

Figure 3:
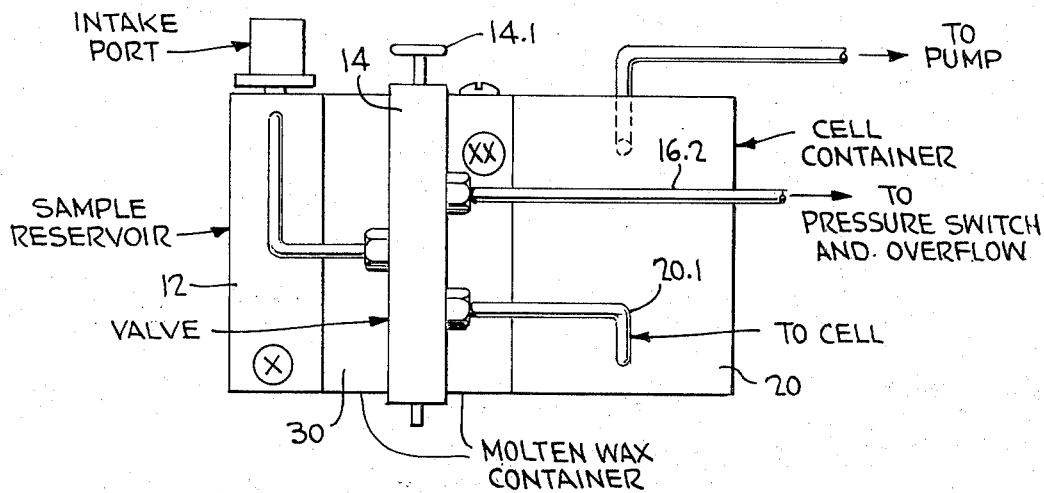
FIG. 3 is a diagrammatic side view of part of a unit showing a heat reservoir controlled by thermostatic switches.

In accordance with a preferred embodiment of the present invention, which will permit separation and analysis of a gas sample without concern for temperature fluctuation, a heat reservoir 30 as shown in FIG. 3 is utilized in conjunction with sample reservoir 12, valve means 14, and sensor cell 20. The heat reservoir which is controlled by thermostatic switches X and XX which are tied into the entire circuitry of the unit contains a material having a high latent heat of fusion. A practical and preferred example is Histowax, a trade name for a mixture of waxes manufactured by Matheson, Coleman, and Bell, East Rutherford, N.J., which has a sharp melting point at 52° C. In the embodiment shown in FIG. 3, reservoir 12 is immediately adjacent to and in heat association with heat reservoir 30 as is valve 14 and sensor cell 20. The gas sample passes from the sample reservoir 12 through valve means 14 and initially is passed to pressure sensing switch 16 through conduit 16.2. However, when valve means 14.1 is depressed, the flow will be through conduit 20.1 into sensor cell 20 as a result of the actuation of pump 18. By connecting the detector unit to an AC or 12-volt DC power source when not in actual use, the molten wax will remain in the fused or molten condition. Once the unit is disconnected from the AC or 12-volt DC power source, it can be carried to any location for collecting a gas sample and analyzing the sample without concern that the unit will drop below a predetermined temperature, i.e., a temperature of approximately 50° C., since the latent heat of the wax will maintain the entire unit at its predetermined temperature for a period of up to one hour or more. The entire unit can be tied into a temperature indicating light which will go on when the unit has fallen below the predetermined heat level, indicating that the unit should again be connected to an AC or 12-volt DC power source to bring the unit up to temperature before further use.

Figure 5:
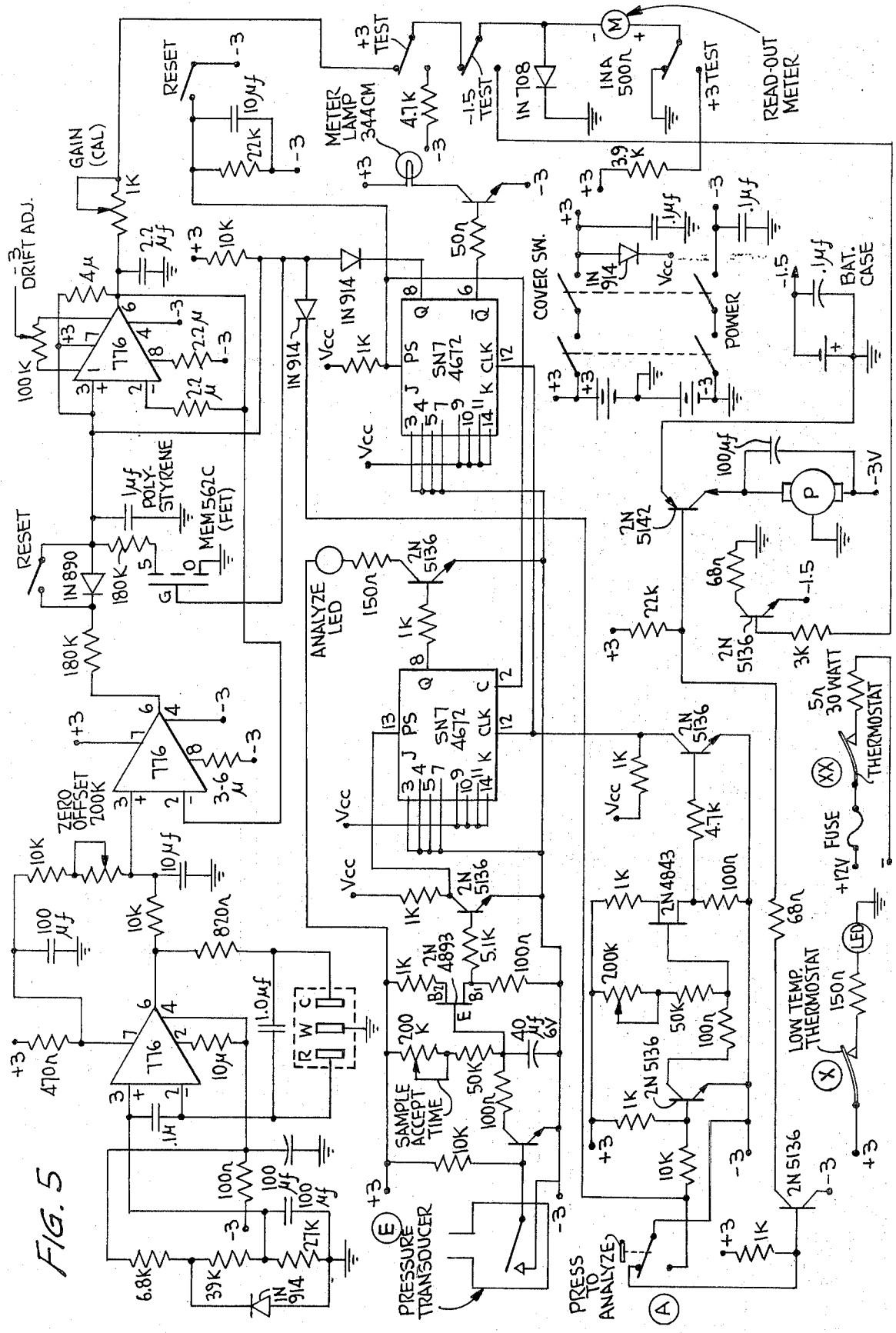
FIG. 5 is a circuit diagram for the entire detecting unit.

FIG. 5 is a detailed drawing of the electronic circuitry of the entire unit shown in FIGS. 1–3. The different sections are letter-keyed to the elements of the detector unit as seen in FIG. 2. Inasmuch as the circuitry as shown in the drawing is self-explanatory to one skilled in the art, it will not be discussed in further detail. Reference is also made, however, to U.S. Ser. No. 88,267 filed Nov. 10, 1970 for an explanation of the circuitry of our detector cell comprising a working electrode, a cathode or counter-electrode, and a reference electrode, wherein the potential of the anode is maintained constant in relation to the reference electrode.

The resistance value of the anode as used herein is the value measured in a cell in which the working electrode (anode) and counter-electrode (cathode) are the same and each has an area of approximately 0.7 cm.$^2$. The resistance of anode, cathode, and electrolyte is measured using a conventional AC-resistance bridge. Since working and counter electrodes are, or are essentially the same, the resistance of the working electrodes is taken to be half of the cell resistance. Electrode separation distances are small, i.e., below 5 mm., and the electrolyte is concentrated sulphuric acid and, therefore, the electrolyte resistance is a negligible factor.

As will be apparent, various modifications can be made in the invention described herein, particularly within the framework of our co-pending applications incorporated herein by reference. Such modifications, being within the ability of one skilled in the art, fall within the scope of and spirit of the present invention and are covered by the appended claims.

It is claimed:

1. A gas detecting and measuring unit comprising in combination intake means, a gas sample reservoir, valve means, first and second passages, an electrochemical cell, means for drawing a gas through said intake means and into said electrochemical cell at a controlled flow rate, and read-out means for reading the quantity of said detected gas; said electrochemical cell comprising an anode which will catalyze an electrochemical reaction with the gas to be detected, a cathode, and an aqueous electrolyte in contact with said anode and cathode, said valve means including actuating means to selectively open said first and second passages, said first passage being in communication with a sensing switch which controls the amount of gas sample flowing into said intake means when said first passage is open, said second passage being in communication with said detecting cell when open whereby the tail or end portion of said gas sample passing through said intake means and from the sample reservoir is selectively fed to and analyzed by said sensing cell.

2. The unit of claim 1 wherein the electrochemical cell comprises a reference electrode in contact with the cell electrolyte and means for maintaining the anode at a fixed potential relative to said reference electrode, said fixed potential of said anode being from about 0.7 to 1.5 volts with respect to a reversible hydrogen electrode potential in said electrolyte of said cell.

3. The unit of claim 2 wherein the anode, cathode, and reference electrode each comprise a polytetrafluoroethylene substrate and a catalyst layer thereon comprising platinum and polytetrafluoroethylene particles.

References Cited
UNITED STATES PATENTS

| | | | |
|---|---|---|---|
| 2,795,223 | 6/1957 | Stampe | 128—2 C |
| 3,471,391 | 10/1969 | Peters et al. | 204—195 R |

GERALD L. KAPLAN, Primary Examiner

U.S. Cl. X.R.

128—2 C; 204—1 T, 274, 277